UNITED STATES PATENT OFFICE.

IVAN LEVINSTEIN AND RICHARD HERZ, OF MANCHESTER, ENGLAND, ASSIGNORS TO LEVINSTEIN, LIMITED, OF SAME PLACE.

BLUISH TRIPHENYL METHANE DYE AND PROCESS OF MAKING SAME.

SPECIFICATION forming part of Letters Patent No. 668,580, dated February 19, 1901.

Application filed April 12, 1898. Serial No. 677,368. (No specimens.)

*To all whom it may concern:*

Be it known that we, IVAN LEVINSTEIN, a citizen of the British Empire, and RICHARD HERZ, Ph. D., a citizen of the German Empire, both residing at Manchester, in the county of Lancaster, England, have invented certain new and useful Improvements in the Production of Aromatic Aldehyde Compounds from Stilbene Derivatives, of which the following is a full, clear, and exact description.

It has been found as an almost generally applicable reaction that if stilbene derivatives are oxidized under certain conditions hereinafter specified the ethylene linkage is broken and substituted aldehydes of the benzene series are produced. For example, orthosulfobenzaldehyde may be obtained by carefully oxidizing stilbene-orthodisulfonic acid with potassium permanganate in the cold. Again, paranitro-orthosulfobenzaldehyde may be obtained if paradinitrostilbene-orthodisulfonic acid be oxidized by a suitable oxidizing agent, preferably potassium permanganate, in the cold. Further, similarly-constituted aldehyde compounds are produced if the products of condensation prepared by heating paranitrotoluenesulfonic acid with caustic alkalies (as described in the specifications to British Letters Patent No. 4,387, dated the 29th of March, 1888, and No. 23,672, dated the 22d of December, 1892,) be subjected to the same method of oxidation.

The following examples illustrate how this invention may be carried into effect:

*Example 1. Production of paranitro-orthosulfobenzaldehyde.*

Stage 1. *Oxidation of paranitro-tolueneorthosulfonic acid to paradinitro-stilbene-orthodisulfonic acid.*—Twenty-four kilos of paranitro tolueneorthosulfonate of soda are dissolved in about two hundred liters of hot water and the solution is kept at a temperature of about from 70° to 75° centigrade. Seventy liters of a solution of sodium hypochlorite (containing one hundred and fifty grams of NaOCl and thirty grams of caustic soda per liter) are then gradually added with constant stirring. The reaction is allowed to proceed until a sample of the liquid acidified with mineral acids does not evolve chlorin. The liquid is then neutralized with hydrochloric or any other suitable acid. Upon cooling a copious precipitate of glistening plates separates from the liquid. After separation by filtration the precipitate is pressed and dried and consists almost entirely of pure dinitrostilbene-orthodisulfonate of soda.

The following are some of the characteristics of the dinitro-stilbene-disulfonic acid: Most of its salts are distinguished by their great power of crystallizing. For example, the neutral sodium salt obtained as above described crystallizes out of water in beautiful yellowish glistening plates, which when dried at a temperature above 100° centigrade lose their water of crystallization and change to lemon-yellow needles. The barium salt, which is nearly insoluble in water, crystallizes in fine yellowish needles, and the mercury salt in beautiful glistening plates. The anilin and phenyl hydrazin salts form almost insoluble fine yellowish-white needles. If the dinitro-stilbenedisulfonic acid be completely reduced—for instance, by means of stannous chlorid and hydrochloric acid—a diamido-stilbenedisulfonic is produced which is identical with that described by Beuder and Schulz in the *Berichte der Deutsche Chemischen Gesellschaft*, Vol. XIX, page 3,237.

Stage 2. *Conversion of the dinitrostilbenedisulfonic acid into paranitro-orthosulfobenzaldehyde.*—Forty-seven kilos of the dinitrostilbenedisulfonate of soda (pure) of Stage 1 are dissolved in about one thousand liters of water and the solution is kept cool, preferably at about from 5° to 10° centigrade. A solution of twenty-one kilos of permanganate of potassium in about five hundred liters of water is then gradually added with continuous stirring. Decoloration of the permanganate takes place at once. When the reaction is completed, the liquid is boiled, filtered from the manganese dioxid, neutralized with hydrochloric or other suitable acid, and evaporated to dryness. The obtained residue consists of about sixty per cent. of the sodium salt of the new paranitro-orthosulfobenzaldehyde. It may be extracted by boiling alcohol and separates out in the cold as a pale-yellow crystalline powder which is extremely soluble in water. The same aldehyde may also be obtained directly from the paranitrotoluene-orthosulfonic acid by oxidizing it with a large excess of sodium hypochlorite; but we prefer, however, to proceed in two separate stages of oxidation, as described above.

The following are characteristic reactions of the new paranitro-orthosulfobenzaldehyde: Phenyl hydrazin produces with it, in an acetic-acid solution, a reddish-brown flocculent phenylhydrazone. Semi-carbazid hydrochlorid gives with the new aldehyde sulfonic acid, in a strong solution of sodium acetate, a yellow crystalline precipitate of the semi-carbazone.

If the paranitro-orthosulfobenzaldehyde be condensed with secondary or tertiary aromatic amins or their sulfonic acids, sulfonic acids of leuco bases result, which produce when oxidized very valuable bluish-green coloring-matters of the triphenylmethane series.

*Example II. Production of aldehyde compounds from the products of condensation prepared by heating paranitro-tolueneorthosulfonic acid with caustic alkalies, as described in the specification of British Letters Patent No. 23,672, dated the 22d of December, 1892.*—43.2 kilos of the so-called "dinitrosostilbenedisulfonic" acid (produced as described in the specification just referred to) are dissolved in about five hundred liters of water. The solution is maintained at a temperature of about 40° centigrade and another solution of twenty-one kilos of potassium permanganate in four hundred liters of water is gradually added with continuous stirring. When the reaction is finished, the liquid is boiled, filtered from the manganese dioxid, and evaporated to dryness. There is thus obtained as a slightly orange-yellow crystalline powder the new aldehyde compound, which probably has the constitution of an azo or azoxyorthosulfobenzaldehyde. Contrary to the original substance, it does not possess any properties of a dye, but presents all the characteristics of an aromatic aldehyde. It is easily soluble in hot water, less soluble in cold water, and insoluble in alcohol. Barium chlorid precipitates out of an aqueous solution of the sodium salt an almost entirely insoluble barium salt.

Phenyl hydrazin produces in an acetic-acid solution of the aldehyde compound a brown flocculent precipitate of the phenylhydrazone.

If the aldehyde compound be condensed with secondary or tertiary aromatic amins or their sulfonic acids, leuco bases of coloring-matters result, which when oxidized produce greenish-blue coloring-matters of the triphenylmethane series, which are fast to alkalies.

*Example III. Production of orthosulfobenzaldehyde from stilbeneorthodisulfonic acid.*—38.4 kilos of stilbeneorthosulfonate of soda (which may be easily produced, for example, by replacing the amido groups of the diamidostilbenedisulfonic acid by hydrogen in the well-known manner) are dissolved in about eight hundred liters of water, and while being rapidly stirred twenty-one kilos of potassium permanganate in about five hundred liters of water are allowed, running gradually. During the reaction the temperature is preferably kept at about 5° centigrade, and a current of carbon is passed through the liquid. When the oxidation is completed, the liquid is boiled up and filtered from the manganese dioxid. It contains the sodium salt of the orthosulfobenzaldehyde and may be directly used for the production of coloring-matters, or the liquid may be evaporated to dryness, and the sodium salt of the benzaldehyde orthosulfonic acid may be extracted from the residue by boiling alcohol, from which it separates on cooling as a white crystalline powder, readily soluble in water. If it be condensed with secondary or tertiary aromatic amins or their sulfonic acids and the lueco base thus obtained be oxidized, beautiful bluish-green triphenylmethane coloring-matters result, which are identical with those described in the specification of British Letters Patent No. 5,068, dated the 6th of March, 1896.

*Production of coloring-matters from the aldehydes obtained as described hereinbefore.*

*Example IV. Production of a bluish-green coloring-matter by condensation of paranitro-orthosulfobenzaldehyde with ethylbenzylanilene sulfonic acid.*—25.3 kilos of paranitro-benzaldehydeorthosulfonate of soda are dissolved in about two hundred liters of water acidified with sulfuric acid. 29.5 kilos of ethylbenzylanilin sulfonic acid are then added and the whole mixture heated to gentle ebullition in a reflux apparatus for about twenty-four hours. When the formation of the leuco base is completed, the liquid is largely diluted with water, an excess of sulfuric acid is added, and the leuco base is oxidized by gradually running in the theoretical amount of a paste of lead peroxid, (prepared from thirty-three kilos of lead nitrate.) When the oxidation is finished, the lead sulfate is filtered off, and the filtrate made alkaline with ammonia and evaporated to dryness. A coloring-matter is thus obtained as a dark blue-green powder with a coppery luster. It dissolves easily in water with a pure greenish-blue color and dyes animal fibers in an acid-bath a greenish-blue shade, which is distinguished by its brightness and fastness to alkalies. The coloring-matter is easily soluble in alcohol and glacial acetic acid with a greenish-blue color, and in concentrated sulfuric acid with a reddish-brown color.

Similar coloring-matters are produced if instead of the ethylbenzylanilin sulfonic acid corresponding amounts of dimethylanilin, diaethylanilin, or monomethylorthotoluidin, &c., are employed.

What we claim as our invention, and desire to secure by Letters Patent, is—

1. The process for the production of triphenylmethane coloring-matters which consist in gradually oxidizing orthotoluene sulfonic acid with an alkali hypochlorite in presence of a caustic alkali thus producing a stilbene sulfonic acid, in neutralizing the alkaline product, in further oxidizing the resulting alkali salt of stilbene sulfonic acid with a permanganate solution, evaporating to dryness, dissolving out the thus-produced aldehyde and condensing it with an aromatic amin component to form a leuco base, and in finally oxidizing the leuco base, substantially as set forth.

2. The process for the production of a bluish-green triphenylmethane coloring-matter which consists in the oxidation of paranitrotoluene orthosulfonic acid with sodium hypochlorite in presence of caustic soda, in neutralizing the alkaline product, in further oxidizing the resulting sodium salt of dinitrostilbene orthosulfonic acid with a permanganate solution, evaporating to dryness and dissolving out the thus-produced paranitroorthosulfobenzaldehyde, condensing it with an alkylated aromatic amin, and in finally oxidizing the leuco base thus produced, substantially as set forth.

3. The process in the production of triphenylmethane coloring-matters which results in the formation of an alkali salt of dinitrostilbene disulfonic acid and which consists in gradually oxidizing orthotoluene sulfonic acid with an alkali hypochlorite in presence of a caustic alkali, and in neutralizing the alkaline mixture, substantially as set forth.

4. The process in the product of triphenylmethane coloring-matters which consists in oxidizing dinitrostilbene disulfonic acid with a solution of potassium permanganate, evaporating to dryness, dissolving out the produced aldehyde, condensing it with an aromatic amin component, and in finally oxidizing the leuco base so produced, substantially as set forth.

In witness whereof we have subscribed our signatures in presence of two witnesses.

IVAN LEVINSTEIN.
RICHARD HERZ.

Witnesses:
  JAS. STEWART BROADFOOT,
  GEO. HEYS.